No. 784,188. PATENTED MAR. 7, 1905.
M. O. STEERE.
STOP MOTION DETECTOR FOR LOOMS.
APPLICATION FILED SEPT. 3, 1902.

WITNESSES
Chas. K. Davies
Chas. Mason

INVENTOR
M. O. Steere
BY W. H. Bartlett
ATTORNEY

No. 784,188. Patented March 7, 1905.

UNITED STATES PATENT OFFICE.

MERRILL O. STEERE, OF PAWTUCKET, RHODE ISLAND.

STOP-MOTION DETECTOR FOR LOOMS.

SPECIFICATION forming part of Letters Patent No. 784,188, dated March 7, 1905.

Application filed September 3, 1902. Serial No. 121,941.

*To all whom it may concern:*

Be it known that I, MERRILL O. STEERE, a citizen of the United States, residing at Pawtucket, in the county of Providence and State of Rhode Island, have invented certain new and useful Improvements in Stop-Motion Detectors for Looms, of which the following is a specification, reference being had therein to the accompanying drawings.

My invention relates to stopping devices for looms, and particularly to those devices whereby the operation of a loom is arrested upon the breaking of any one of the warp-threads.

The purpose of my invention is to produce a detector which shall be positive of action, simple of structure, and so constituted that only one detector shall be required for each pair of threads.

Figure 1:
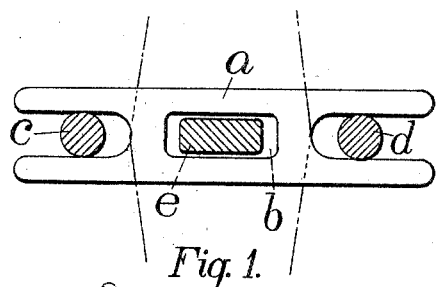
Figure 4:
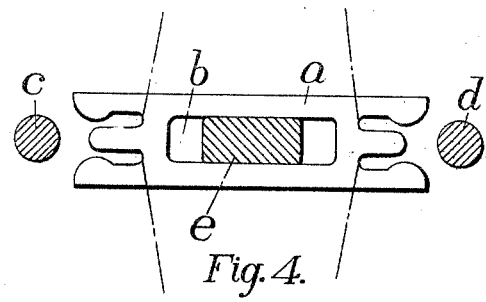
Figure 6:
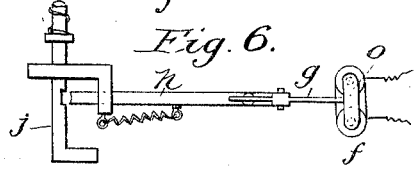
Figure 3:
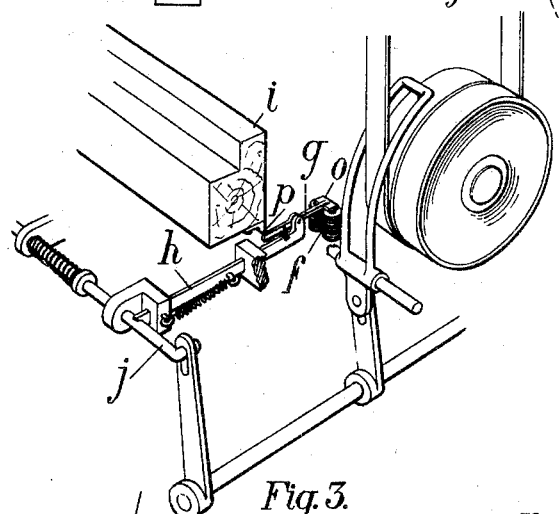
Figure 5:
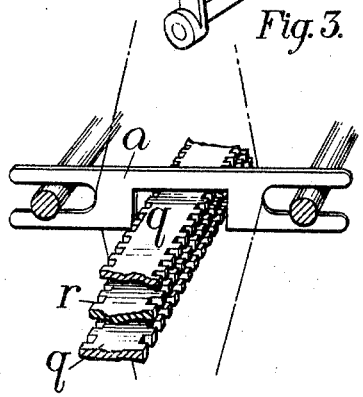
Figure 2:
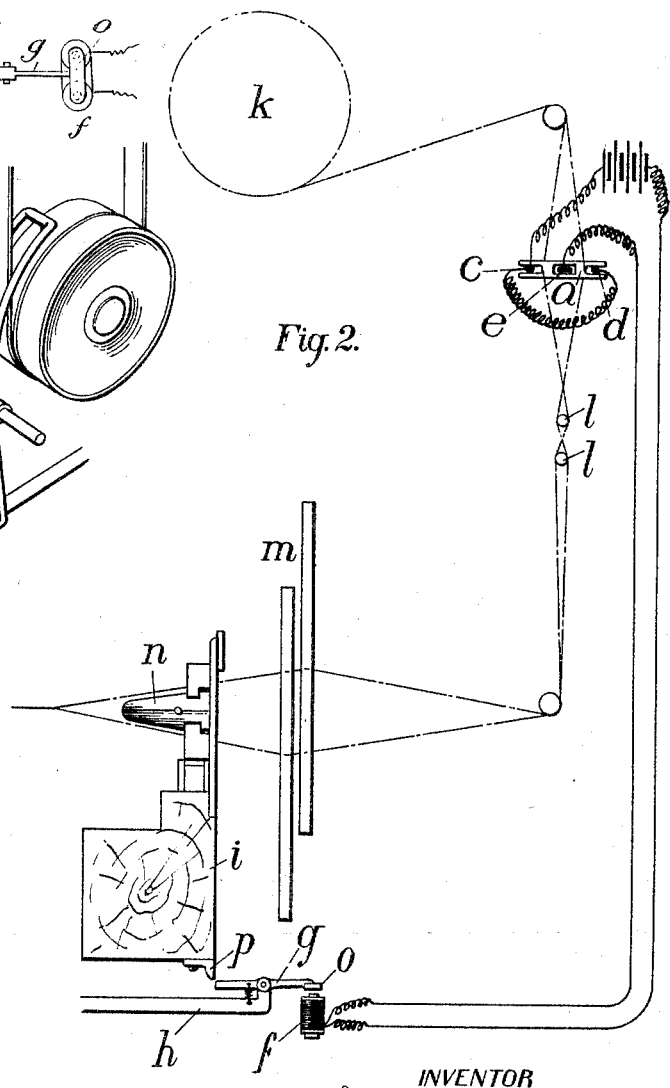

In the accompanying drawings, forming a part of this specification, Figure 1 is a side view of the detector, showing the manner in which it is mounted and threaded. Fig. 2 is a diagrammatic representation of a loom, showing the mode of application of the detector to the loom in conjunction with an electric stop-motion. Fig. 3 shows a detail of the electric stop mechanism; Fig. 4, a modified form of my detector for use with an electric stop; Fig. 5, an adaptation of my detector for use with a mechanical stop. Fig. 6 is a broken top plan of so much of the mechanism as shows the possibility of engagement between the detent-rod $h$ and the belt-shipper rod $j$.

The essence of my invention is a detector which interposed between two tension-threads so spreads them that when intact they react to maintain the detector in its normal position, but that when one is broken the remaining thread positively shifts the detector into either mechanical or electrical engagement with the stopping mechanism of the loom to arrest its action.

My improved detector is especially adapted for use with electric stop devices, and is therefore particularly explained with reference to such form of stop-motion.

The detector $a$ is preferably formed with forked extremities and an opening $b$ midway thereof. By the said forked extremities it is supported on two rods or bars $c$ and $d$, which constitute a portion of an electrical circuit. Through the mid-opening $b$ extends a second bar or connection $e$, which is also included in the electrical circuit and which is so thin that when the detector is in its normal position, with bar $e$ midway of the ends of the opening $b$, there is no connection between the detector and the said bar. By shifting the detector longitudinally it can be made to touch the bar $e$, thus connecting the latter with the two bars $c$ and $d$. The two bars $c$ and $d$, the bar $e$, and the stop devices are all included in one electric circuit, in which the detector $a$ forms a switch or cut-out controlled by the tension of its warp-threads. The detector threaded as indicated, with one thread through each fork, is maintained by the reacting tensions of the two threads in its normal position and out of contact with the bar or connection $e$. If, however, one of the warp-threads breaks, the remaining thread under tension positively shifts the detector into contact with the bar $e$ and completes the electric circuit, causing the action of the stop device.

The stop device may be of various forms. In the one illustrated an electromagnet $f$ is mounted adjacent the lever $g$, which is pivotally mounted on the spring-controlled detent-rod $h$ and is adapted to be shifted by the said magnet to engage with the lay or batten $i$ or a projection thereon. The detent-rod $h$ is held by a suitable spring in engagement with the spring-actuated belt-shipper rod $j$ to maintain the belt on the tight or driving pulley of the loom.

Belt-shifting mechanisms are so exceedingly common that it is considered unnecessary to give an extended description of the mechanism employed. Any usual construction might be employed.

The action of my device and its relation to the loom are herewith described. Referring to Fig. 2, the warp-threads are drawn under tension from the warp-beam $k$ past the detector a, the lease-rods l, and through the harness m to the shuttle at n and past the lay or batten i in usual manner. As they pass the detector a the alternate warp-threads are passed on opposite sides of the bar e and are placed in the forked ends of the detectors, of which there are a plurality. As above stated, each pair of opposed threads reacts one against the other to maintain the detector in its normal position out of contact with the bar e. Whenever one thread of a pair breaks, the other under tension forces the detector into contact with the bar e, connecting the latter with either the bar c or d and completing the electrical circuit. The circuit completed, the magnet is excited and attracts the armature o, thereby shifting the lever g and raising its opposite extremity into line with the projection p on the lay i. As the lay i reciprocates the projection p engages the lever g, and thereby shifts the detent-rod h, releasing the spring-actuated shipper-rod j, which then transfers the belt to the loose pulley and causes the stopping of the machine.

My improved detector is not only novel and useful, but it possesses distinct advantages over the corresponding devices usually employed heretofore. The detectors previously used have generally depended solely on their weight to effect the desired connection or engagement.

I am not aware of any existing stop-motion detector which would be operative except as it is itself acted on or brought into abnormal position in whole or in part by the action of gravity on the breakage of a thread.

My improved detector does not depend on its weight to effect the operative connection of the stop devices, but is positively moved upon the breaking of either thread by the remaining taut thread, as by a spring. Each thread engages a fork instead of an eye, and therefore much time and trouble are saved in threading the detectors and in threading the loom as a whole.

The above-described detector is susceptible of various modifications without departing from the spirit and scope of my invention. Fig. 4, for example, shows a form in which the detector is supported on the middle conductor e and is adapted to be shifted into contact with either of the two rods c or d adjacent its ends while the threads engage two tongues in the end forks.

Fig. 5 illustrates an adaptation of the detector to a mechanical stop device of usual form. Connected with the stop devices are the normally stationary notched or shifter bars q q, and between the latter is continuously reciprocated a second notched bar r, termed the "detector-bar." In case one of the threads breaks the detector is forced by the remaining thread into engagement with the notched bars to connect them, and the shifter-bars, locked thereby to the reciprocating detector-bar, are moved by the latter to effect the stopping of the loom.

It is obvious that further modifications may also be made.

Therefore, without limiting myself to the precise form or arrangement of structure employed, I claim—

1. The combination in a loom-stop-motion device of adjacent electrical conductors, with a detector mounted on one conductor and restrained from contact with the other by the reaction of two opposed threads, and adapted to be moved, in case one thread breaks, into contact with the second conductor to complete the electric circuit and cause the stopping of the loom.

2. A stop-motion detector for looms consisting of a movable piece normally engaging two opposed, tensioned threads, and a support for said detector, whereby the detector is positively shifted by the action of one thread when the resistance of the other thread fails, independently of the action of gravitation.

3. A stop-motion detector for looms consisting of a bar notched at its ends, with which notches opposed tensioned threads normally engage, and a support for said detector along which the detector is shifted entirely by the tension of one thread when the resistance of the opposing thread is removed.

4. A stop-motion detector for looms consisting of a straight flat plate of thin metal, having notches or forks in its opposite ends adapted to receive opposing threads.

5. The combination in a loom stop-motion, of a movable detector normally engaging two opposed tensioned threads, a support for said detector on which said detector is shifted entirely by the action of one thread when the resistance of the other thread is removed, and stop mechanism controlled by said detector, and thrown into operation by the shifting of said detector to stop the loom.

6. The combination, in a loom-stop, of a detector notched at its opposite ends, to receive opposed tensioned threads, a conductor-support for said detector, an electrical contact-piece with which said detector makes engagement when shifted to abnormal positions, and electrical connections from the support and contact-piece by which the loom action is stopped when contact is made by the shifting of the detector.

7. The combination, in a loom-stop, of a detector normally engaging two oppositely-tensioned threads, electrical conductors in proximity to said detector, in position that the electric circuit is controlled by the detector when shifted to abnormal position, and a loom stop mechanism controlled by said electric circuit.

8. In a loom-stop, the combination of a detector engaged at opposite ends by opposed tensioned threads, and movable longitudinally in either direction by the action of one thread when the resistance of the other is removed, and means controlled by said detector when shifted in either direction and acting to stop the loom.

In testimony whereof I affix my signature in presence of two witnesses.

MERRILL O. STEERE.

Witnesses:
ARTHUR A. ARMINGTON,
EDWIN C. SMITH.